July 9, 1940.      D. E. HUMPHREY      2,206,958
SPEED REDUCTION MECHANISM
Filed Dec. 10, 1938      2 Sheets-Sheet 1
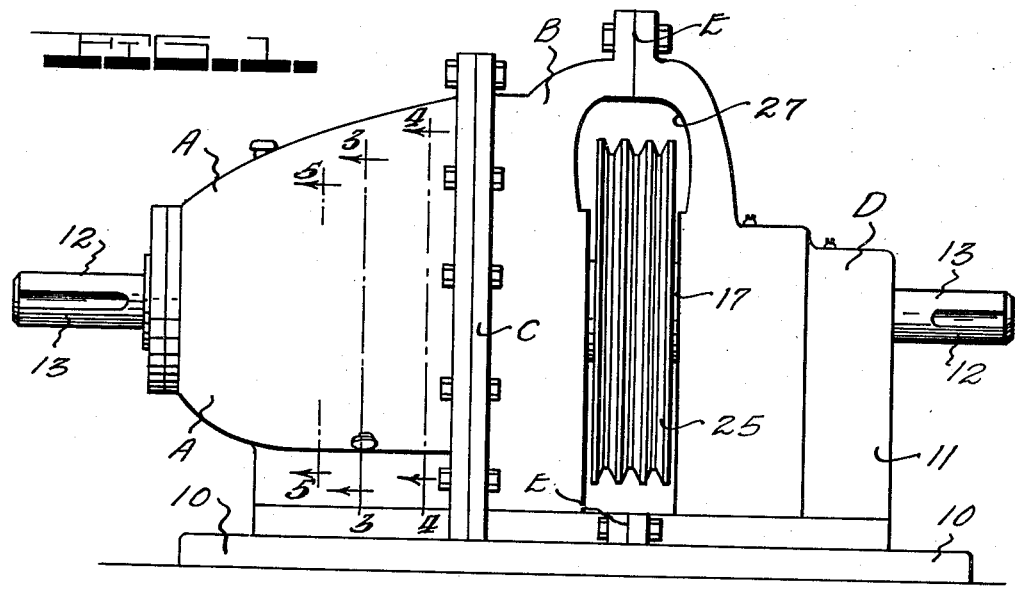
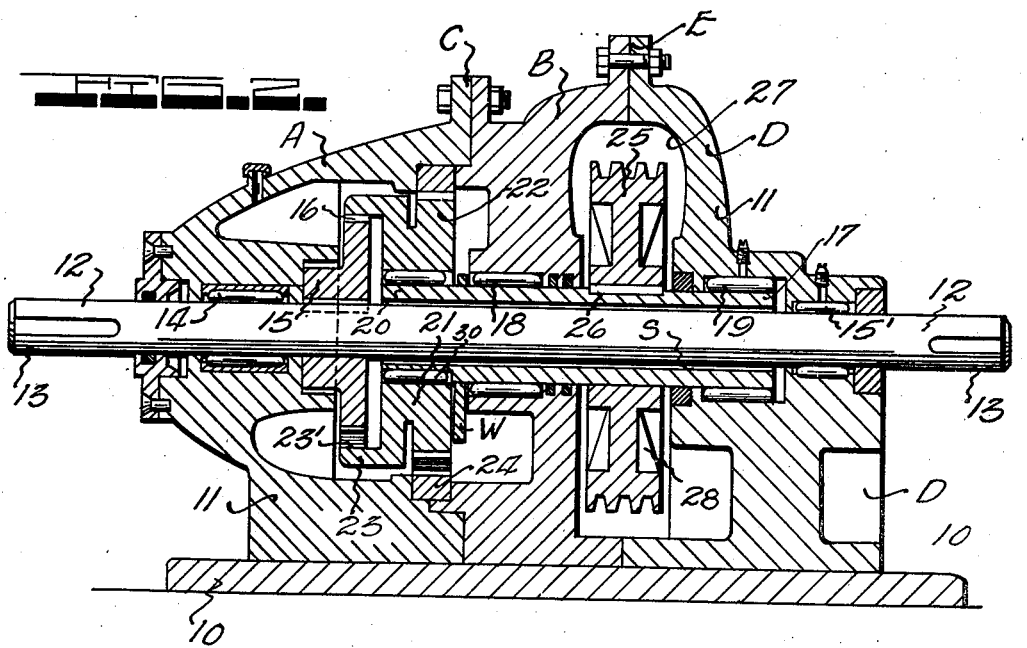
Dee E. Humphrey
INVENTOR.
BY
ATTORNEY.

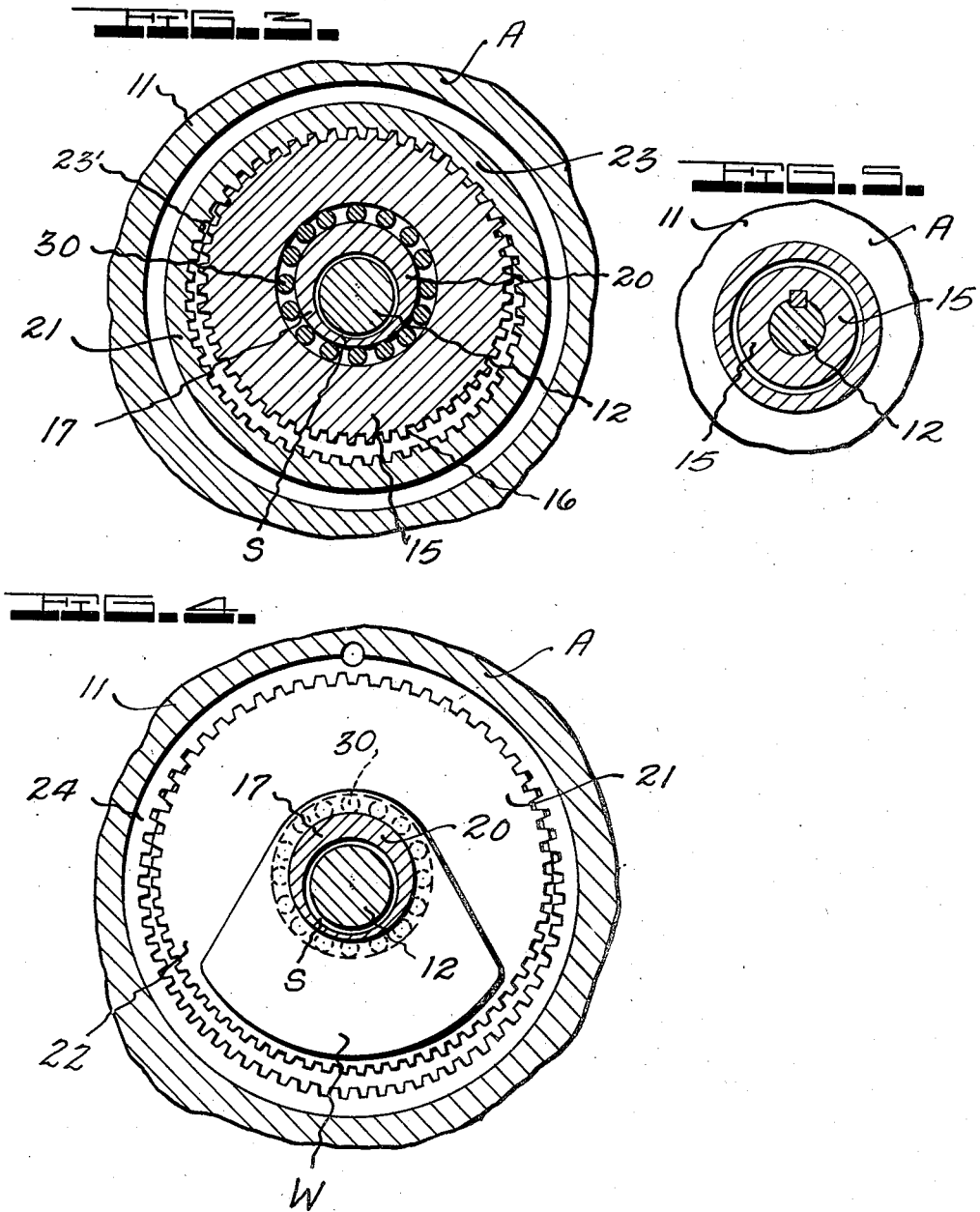

Patented July 9, 1940

2,206,958

UNITED STATES PATENT OFFICE 2,206,958

SPEED REDUCTION MECHANISM

Dee E. Humphrey, Dallas, Tex.

Application December 10, 1938, Serial No. 244,903

1 Claim. (Cl. 74—308)

This invention relates to new and useful improvements in mechanical reduction devices particularly adapted to pumping units.

This invention is filed as an improvement and in conjunction with my copending application filed June 28, 1938, bearing the Serial Number 214,752.

One object of the invention is to provide a device simple in construction and cheap in manufacture and also which requires only a minimum up-keep cost.

Another object of the invention is to provide a mechanism whereby torque applied to suitable means positioned on a hollow shaft to transmit, through a series of rotary and stationary reduction gears, movement to a solid shaft arrangement within said hollow shaft, whereby suitable connections may be made to the ends of said solid shaft.

Another object of the invention is to provide a device for gear reduction which is compact, easily assembled and disassembled for replacement of parts and which operates with a low coefficient of friction.

A further object of the invention is to provide a device for gear reduction in which a plurality of gear teeth are constantly in mesh, thereby reducing the possibility of stripping said gear teeth.

Still another object of the invention is to provide a gear reducing device particularly adapted for use in the pumping of wells which includes a continuous shaft extending from end to end, thereby insuring perfect synchronization and equal wear on the gears, and further insuring perfect unison in the movements of the pumping pitmans.

Another object of the invention is to provide a solid low speed drive shaft within a hollow high speed cam shaft, said shafts being independent of each other and being connected together only through a medium of reduction gears.

A still further object of the invention is to provide a device wherein a predetermined gear reduction is had and dynamic balance is effected during the operation.

Still another object of the invention is to provide a device capable of transmitting torque from a driving element to a driven element, in such manner that high efficiency is effected in gear reduction.

The invention will be more readily understood from a reading of the following specification and by reference to the accompanying drawings wherein a means for carrying out the invention are shown and wherein:

Figure 1 is a side elevation of a gear reduction device constructed in accordance with the present invention.

Figure 2 is a longitudinal vertical sectional view of the same.

Figure 3 is a transverse vertical sectional view taken on the line 3—3 of Figure 1.

Figure 4 is a view similar to Figure 3 taken on the line 4—4 of Figure 1, and

Figure 5 is a transverse vertical sectional view taken on the line 5—5 of Figure 1.

In the drawings the numeral 10 designates a suitable rectangular base having a housing 11 mounted thereon. The housing comprises two sections A and B being suitably secured together by flanges C. An outboard bearing case D is similarly secured to the portion B at E.

A solid shaft 12 is mounted within the housing 11 and bearing case D. The ends 13 of this shaft protrude beyond the housing and case (Fig. 2), whereby pitman arms (not shown) or other equipment to be operated may be secured thereto.

The shaft 12 is supported by suitable needle bearings 14 in the portion A and 15' in the bearing case D. Mounted and keyed upon the shaft 12 is a circular gear 15, having external teeth 16.

A hollow shaft 17 surrounds the shaft 12 and is journaled in bearings 18 in the portion B and 19 in the case D. One end 20 of the shaft 17 extends into the interior of the portion A and has a double gear arrangement 21 journaled thereon. The end 20 is constructed to form an eccentric (Figs. 3 and 4) for purposes hereinafter described. The double gear arrangement 21 provides two integral gears 22 and 23, said gears 23 being bell-shaped and having internal teeth 23'. The gear 22, as may be seen by observing Figure 2, is of a larger diameter than that of the gear 23.

The teeth 23' of the gear 23 engage the teeth 16 of the gear 15, while the gear 22 engages a stationary internal gear ring 24 mounted in the portion A.

A pulley wheel 25 is keyed at 26 to the hollow shaft 17 in the space 27 formed between the portion B and the bearing case D. Fins 28 are formed on the wheel 25 whereby a cooling action is afforded to the bearing case D and the housing 11.

It is to be noted that the gear 23 is of a larger diameter than that of the gear 15 and also that the ring gear 24 is of a larger diameter than that of the gear 22 (Figs. 3 and 4), and that said gear 21 is secured to the portion 20 of the shaft 17 only by means of needle bearings 30. Also a counter-balance weight W is suitably secured to the shaft 12 to off-set the cam action of said hollow shaft 12 (Figs. 2 and 4).

In operation a suitable connection is made between the pulley wheel 25 and a suitable source of power (not shown). As the wheel 25 is rotated, movement is imparted to the hollow shaft 17. The eccentric 20 causes the gear 22 to travel or "walk" around the larger diameter internal gear 24, while the gear 15 moves around the internal gear 23 in a like manner. Thus as the teeth of the gear 22 engage the stationary gear teeth of the ring 24 the gear 23 is rotated through the movement of the eccentric 20 of the shaft 17.

The integral gear 23 is rotated with the gear 22 and will impart movement to the gear 15. This gear 15 being keyed to the solid shaft 12 will of course, rotate this shaft. As has been stated any mechanism to be operated may be secured to the ends 13 of the shaft 12.

Through the medium of the wheel 25 and shaft 17 rotation of the gear arrangement is obtained, and as stated rotation of the gears will impart movement to the shaft 12. The gears 15, 22, 23 and 24 are so arranged to accomplish a reduction in speed between the shafts 17 and 12. That is if a predetermined ratio of 50 to 1 is established the number of teeth are so regulated as to accomplish the objective.

Any given ratio may be established by a change in the number of teeth in any one or all of the aforedescribed gears. It is to be particularly noted that at no time or place do the shafts 12 and 17 contact each other and a space S is maintained continuously.

Entrance into the interior of the housing 11 may be had by merely removing the securing elements from the flanges C.

From the foregoing it may be seen that any desired reduction may be had with the above described invention, and as stated this device is cheap in manufacture and simple and sturdy in construction.

Manifestly, the construction as shown and described is capable of some modification and such modification as may be construed within the scope and meaning of the appended claim is also considered to be within the spirit and intent of the invention.

What is claimed is:

A mechanical movement comprising a centrally disposed driven shaft, a gear mounted upon said shaft, a hollow concentrically mounted driving shaft, an internal gear eccentrically mounted upon said hollow driving shaft, the teeth of said latter gear enmeshing a segment of the teeth of said first named gear, an external gear integrally formed with said internal gear, a stationary, internal ring gear enmeshing a segment of the teeth of said second named external gear, a pulley wheel fixed to said hollow driving shaft, whereby torque transmitted to said pulley wheel will cause rotation of said centrally disposed shaft through said internal and external gears.

DEE E. HUMPHREY.